US012612948B2

(12) United States Patent (10) Patent No.: US 12,612,948 B2
Tsuneda (45) Date of Patent: Apr. 28, 2026

(54) CAM CLUTCH UNIT

(71) Applicant: TSUBAKIMOTO CHAIN CO., Osaka (JP)

(72) Inventor: Hirokazu Tsuneda, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 19/088,188

(22) Filed: Mar. 24, 2025

(65) Prior Publication Data

US 2025/0305544 A1    Oct. 2, 2025

(30) Foreign Application Priority Data

Mar. 26, 2024    (JP) ................................. 2024-049874

(51) Int. Cl.
| | |
|---|---|
| *F16D 41/07* | (2006.01) |
| *F16C 19/26* | (2006.01) |
| *F16C 33/36* | (2006.01) |
| *F16C 41/00* | (2006.01) |

(52) U.S. Cl.
CPC .............. *F16D 41/07* (2013.01); *F16C 19/26* (2013.01); *F16C 33/363* (2013.01); *F16C 41/001* (2013.01)

(58) Field of Classification Search
CPC .. F16D 41/06; F16D 41/07; F16D 2250/0023; F16C 41/001; F16C 19/26; F16C 33/363; F16C 2220/44
See application file for complete search history.

(56) References Cited

U.S. PATENT DOCUMENTS

2023/0228302 A1*    7/2023    Fukuda ................... F16D 41/07
                                                                192/45.006

FOREIGN PATENT DOCUMENTS

| | | | | |
|---|---|---|---|---|
| GB | 753362 A | * | 7/1956 | ............. F16D 41/07 |
| JP | 2005-106135 A | | 4/2005 | |

* cited by examiner

*Primary Examiner* — Richard M Lorence
(74) *Attorney, Agent, or Firm* — WHDA, LLP

(57) ABSTRACT

A cam clutch unit includes a plurality of cams and rollers. The rollers each include an axially extending shaft portion and a pair of large-diameter portions continuous with respective both ends of the shaft portion. The space between the pair of large-diameter portions forms a groove for an annular spring to fit in. The shaft portion forming the bottom surface of the groove has an outer circumferential surface that allows the spring to contact the groove at a central position in an axial direction of the groove. The outer circumferential surface is a curved surface so that the shaft portion increases in outside diameter monotonically from the central position in the axial direction of the groove towards the large-diameter portions.

7 Claims, 10 Drawing Sheets

Related Art

Related Art

Related Art

CAM CLUTCH UNIT

BACKGROUND OF THE INVENTION

1. Field of the Invention

The present invention relates to a cam clutch unit that transmits and interrupts torque between an input shaft and an output shaft.

2. Description of the Related Art

A cam clutch including: a plurality of cams arranged between coaxial and relatively rotatable inner and outer races; a cage ring having a plurality of pockets that restrict circumferential relative movements of the cams; and an annular spring that biases the cams, is known (see Japanese Patent Application Publication No. 2005-106135).

In such a cam clutch, some of the plurality of cams may be replaced with freely rotatable rollers for guaranteeing the coaxiality between the inner and outer races.

For example, a cam clutch unit 210 shown in FIG. 16 has a plurality of cams 220 and a plurality of rollers 230 circumferentially arranged between an inner race and an outer race that are coaxial and rotatable relative to each other. The cams 220 and rollers 230 are accommodated in respective cam pockets 215 and roller pockets 216 of a cage ring 211, and are restricted from moving relative to each other in the circumferential direction.

The cams 220 and rollers 230 have circumferential grooves 221 and 235, respectively, with an annular spring 240 being accommodated in the grooves 221 and 235 so that the cams 220 and rollers 230 are biased toward the inner race.

SUMMARY OF THE INVENTION

Rollers 230 as the components of the cam clutch unit 210 are formed by a machining process, for example. As shown in FIG. 17, a shaft portion 231 that forms a bottom surface 236 of the groove 235 has a flat outer circumferential surface as viewed from the side. For smooth rolling of the rollers 230, the groove 235 has an axial length that is greater than the wire diameter of the spring 240 so that there are clearances G between the spring 240 and respective large-diameter portions 232 of the roller 230.

Such rollers 230 may easily tilt inside the pockets 216 of the cage ring 211 as shown in FIG. 18. When such rollers 230 tilt, the rollers 230 cannot roll smoothly on respective rolling surfaces of the inner and outer races, and may cause an increase in friction torque, or can become jammed during freewheeling of the clutch.

The clearance G between the groove 235 and the spring 240 also allows the rollers 230 to move axially. As shown in FIG. 19, an axial movement of the roller 230 shifts the spring 240 in the same direction as the direction of movement of the roller 230. Several rollers 230 moving in opposite directions will bend the spring 240 in a zigzag shape and inhibit the spring from exerting an intended biasing force on the cams 220. For a cam clutch unit configured without a cage ring, in particular, axial misalignment of each roller may result in variations in the width of the cam clutch unit.

Other issues include limited options for the method of forming the grooves 235 and increased production costs, as well as possible lack of strength of the shaft portion 231 caused in a case where the diameter of the shaft portion 231 configuring the groove 235 is reduced.

The present invention has been made based on the circumstances described above, and aims at providing a cam clutch unit that reduces friction loss and suppress jamming risk during freewheeling, improves engagement performance of the cams, and reduces width variations and machining costs.

The above object is achieved by a cam clutch unit according to the present invention, including: a plurality of cams and a plurality of rollers arranged between an inner race and an outer race that are coaxial and rotatable relative to each other; and an annular spring fitted in a groove formed in each of the cams and the rollers, and biasing the cams to make contact with the inner race and the outer race. The rollers each include an axially extending shaft portion and a pair of large-diameter portions continuous with respective both ends of the shaft portion, the groove being formed by a space between the pair of large-diameter portions so that the shaft portion contacting the spring receives a biasing force from the spring. The shaft portion forming a bottom surface of the groove has an outer circumferential surface that allows the spring to contact the groove at a central position in an axial direction of the groove. The outer circumferential surface is a curved surface so that the shaft portion increases in outside diameter monotonically from the central position in the axial direction of the groove towards the large-diameter portions.

According to one aspect of the present application, the bottom surface of the groove guides the spring towards the center line in the axial direction of the groove, and corrects the orientation of the rollers. This allows the rollers to smoothly roll on the respective rolling surfaces of the inner race and outer race. The rollers are thus prevented from tilting about a radially extending axis, or from moving in the axial direction, which helps to reduce friction loss and roller jamming risk during freewheeling.

The grooves of the rollers and the grooves of the cams are kept in axial positions that match each other, so that the spring can be prevented from becoming zigzagged or changing shape. As a result, the cams can be biased with a correct amount of force, which improves the engagement performance of the cams.

In addition, the rollers themselves are dimensionally interchangeable with conventional rollers. This makes the rollers highly versatile, as the rollers can also be used in conventional cam clutch units, with or without a cage ring.

In a cam clutch unit without a cage ring, preventing the rollers from moving axially helps to reduce axial dimensional variation and to increase design flexibility.

According to another aspect of the present application, a rolled thread formed by a thread rolling process is used as the groove of the roller. This enables the rollers to have high strength because the fiber flow of the material forming the rollers is not cut, and also because of the increased density by compression. Thread rolling does not produce chips as in a cutting process, and allows processing in a short time with relatively low power, which can help to achieve high productivity and to reduce production costs.

According to another aspect of the present application, the grooves of the rollers and the grooves of the cams are more easily matched with each other in their axial positions, which helps to improve the engagement performance of the cams, and to reduce variations in axial dimensions.

According to another aspect of the present application, the effect of correcting the orientation of the rollers is reliably achieved. Thus the effects of reducing friction loss and jamming risk during freewheeling are reliably achieved, and the engagement performance of the cams can be improved.

DESCRIPTION OF THE PREFERRED EMBODIMENTS

Figure 1:
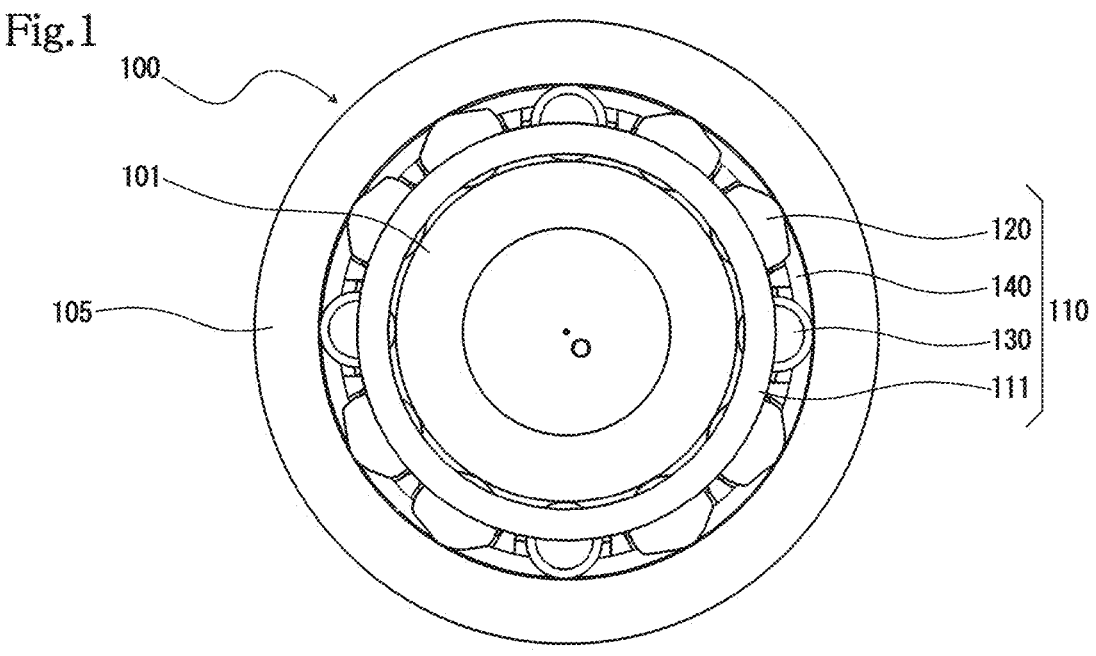
FIG. 1 is a side view illustrating a configuration example of a cam clutch including the cam clutch unit according to the present invention as seen from an axial direction.
Figure 2:
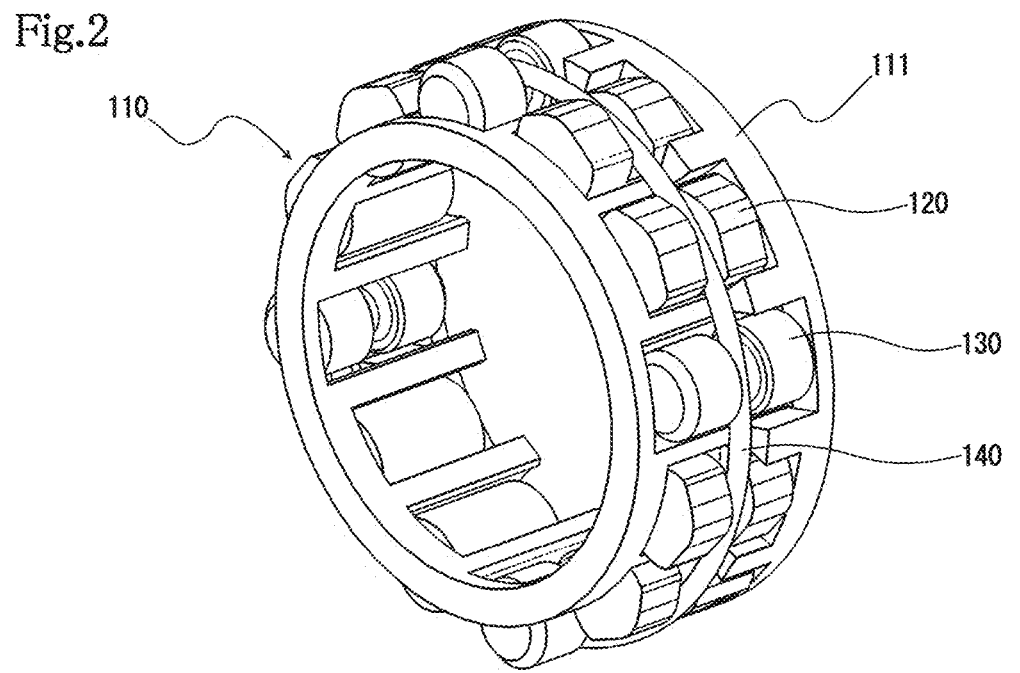
FIG. 2 is a perspective view illustrating the configuration of the cam clutch unit.
Figure 3:
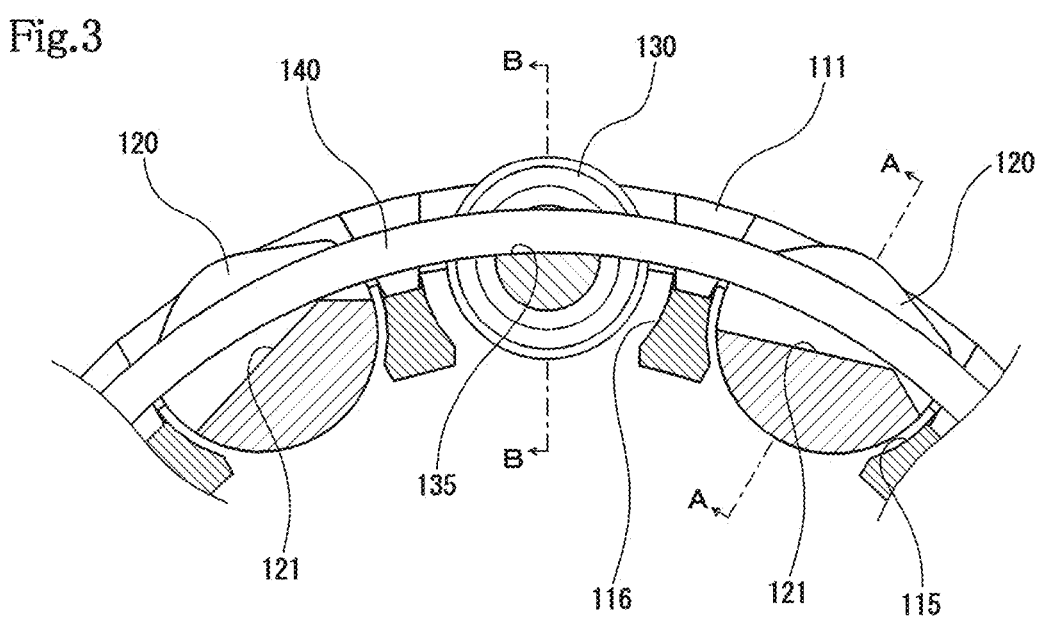
FIG. 3 is a diagram illustrating a part of a cross-section of the cam clutch unit shown in FIG. 2 in a plane perpendicular to the rotation axis.
Figure 4:
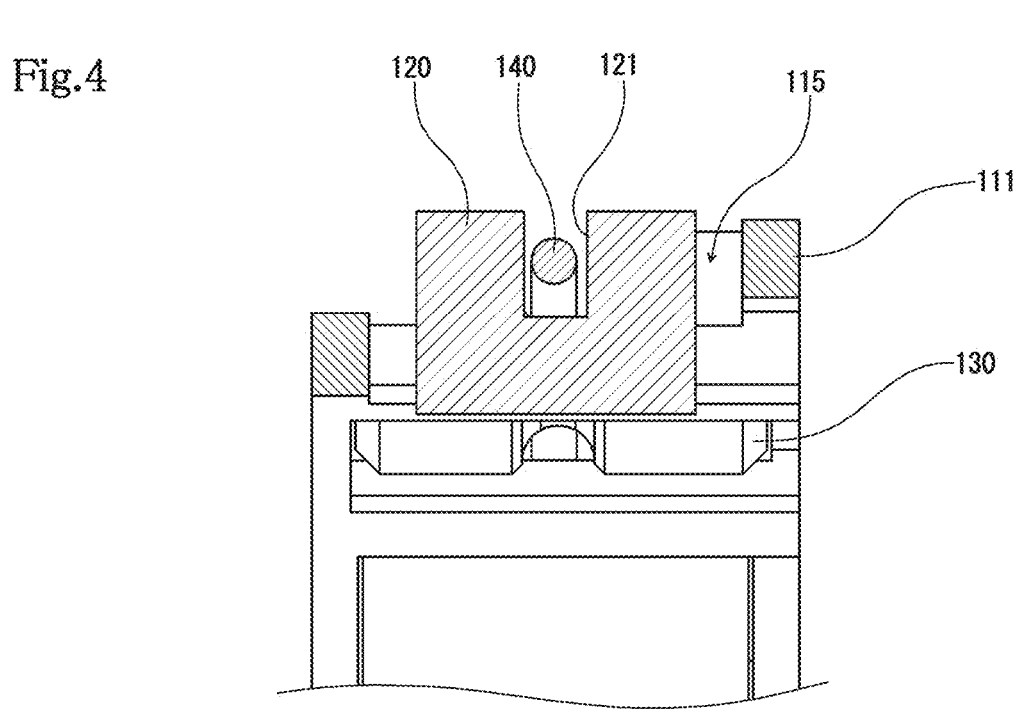
FIG. 4 is a cross-sectional view along A-A in FIG. 3.

The cam clutch unit 110 according to one embodiment of the present invention is arranged between an inner race 101 and an outer race 105 that are coaxial and rotatable relative to each other, and forms a part of a cam clutch 100, as shown in FIG. 1. Reference symbol O in FIG. 1 denotes the rotation axis.

The cam clutch unit 110 includes, as shown in FIG. 2 to FIG. 5, a cage ring 111 coaxial with the inner race 101 and outer race 105; a plurality of cams 120 and a plurality of rollers 130 circumferentially aligned and held by the cage ring 111; and an annular spring 140 biasing each of the cams 120 to make contact with the inner race 101 and outer race 105, as well as pressing each of the rollers 130 against the inner race 101.

Figures 5, 6:
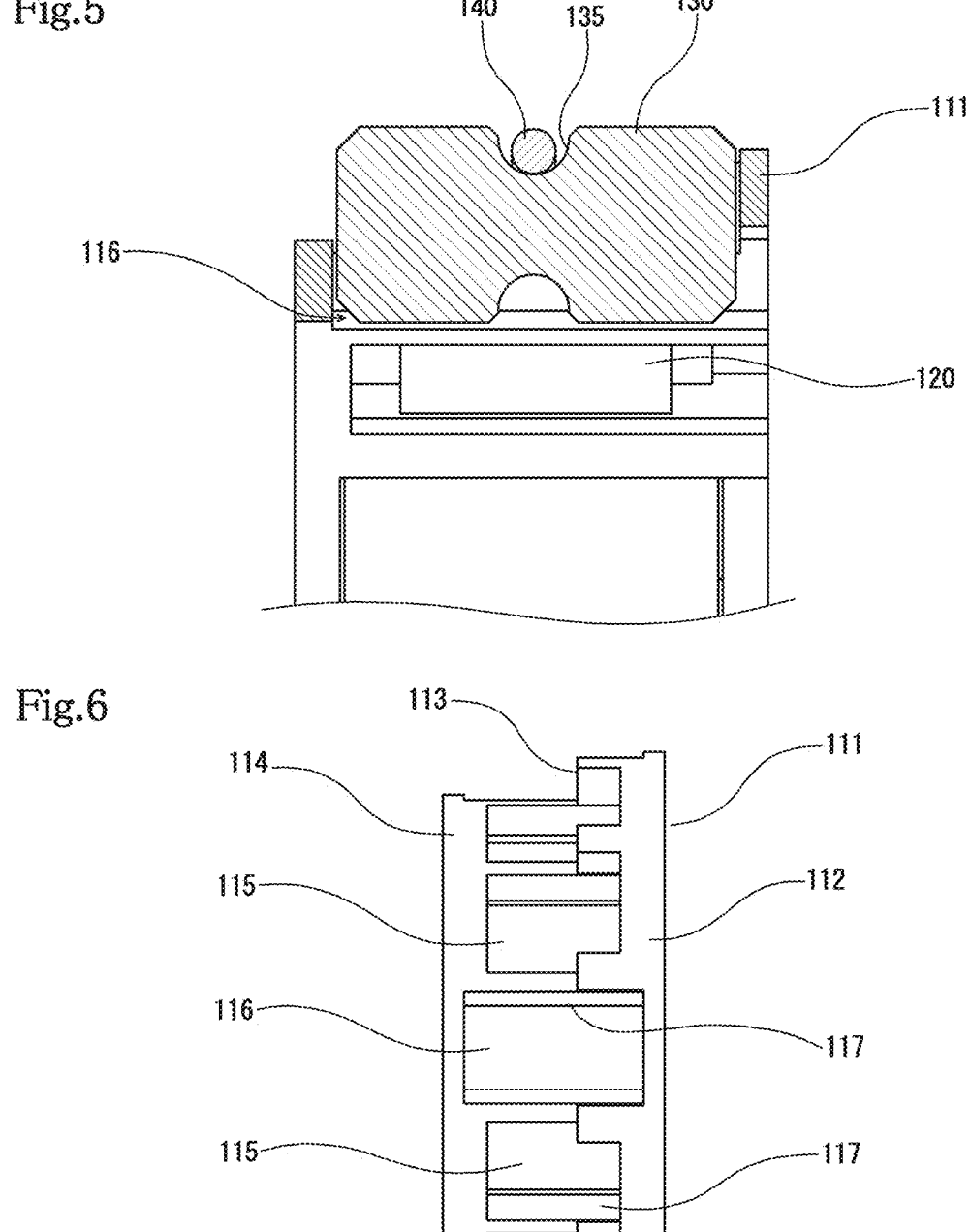
FIG. 5 is a cross-sectional view along B-B in FIG. 3.
FIG. 6 is a front view illustrating a configuration of a cage ring.

The cage ring 111 in this embodiment has a two-step cylindrical shape as shown in FIG. 6, including a large-diameter cylindrical part 112 and a small-diameter cylindrical part 114 axially continuous with one end of the large-diameter cylindrical part 112 via a step 113. The step 113 is positioned at the center in the axial direction.

The cage ring 111 is formed with a plurality of cam pockets 115, each corresponding to each of the plurality of cams 120, and a plurality of roller pockets 116, each corresponding to each of the plurality of rollers 130. The pockets extend axially over the large-diameter cylindrical part 112 and small-diameter cylindrical part 114, and radially through, i.e., open both on the outer and inner sides.

The cam pockets 115 and the roller pockets 116 are shaped to surround the four sides of the cams 120 and rollers 130 as viewed in plan from a radial direction. The pockets are configured to accommodate the cams 120 and rollers 130 with their axial ends on one side radially protruding from the outer circumferential surface of the small-diameter cylindrical part 114.

Bars 117 axially extending and defining the cam pockets 115 have a cam support surface, and bars 117 axially extending and defining roller pockets 116 have a roller support surface, each of which is shaped to restrict the cams 120 and rollers 130 from moving toward the inner race.

In this embodiment, the cage ring 111 has four roller pockets 116 to hold four circumferentially equally spaced rollers 130, and eight cam pockets 115 formed such that two cams 120 each are disposed between adjacent rollers 130 at circumferentially equal intervals.

The rollers 130 in this cam clutch 100 help to keep the inner race 101 and the outer race 105 coaxial without using other components such as bearings, as well as allow the cam clutch to support a radial load. Any number of rollers 130 can be provided, as long as the rollers being provided by at least three of the rollers. The number and arrangement pattern of the cams 120 are not limited particularly, and can be changed as required according to the purposes of use.

The roller pockets 116 are formed to hold the rollers 130 such that both end faces of the rollers 130 are positioned radially more outwardly than both axial end faces of the cams 120 accommodated in the cam pockets 115.

Each of the plurality of cams 120 has a groove 121 at the center in the axial direction for the spring 140 to sit on or fit in.

In this embodiment, the groove 121 has a bottom in an inclined shape with a protrusion in an offset position. The spring 140 causes the cams 120 to rotate in a direction to make contact with the inner race 101 and outer race 105 by pressing the protrusion at the bottom of the grooves 121.

Figures 7, 8:
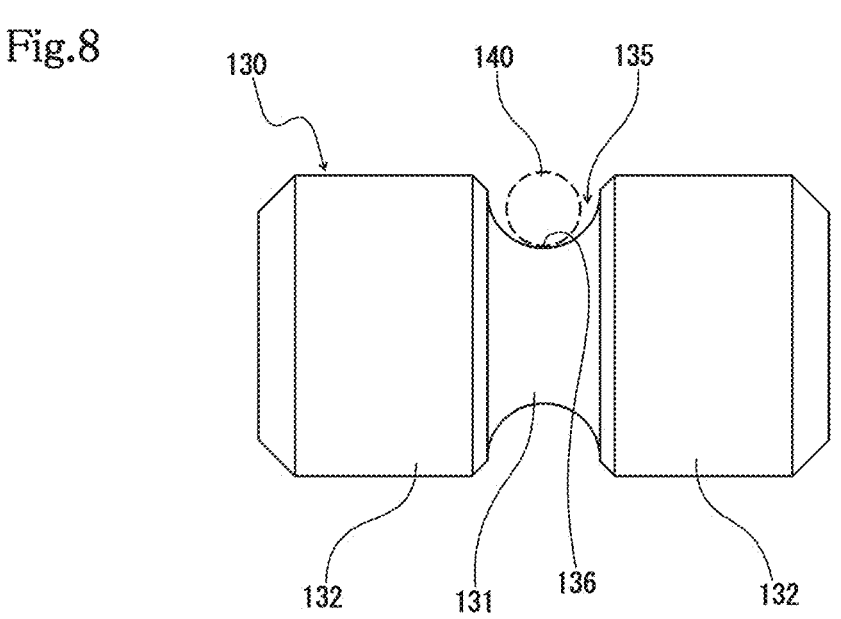
FIG. 7 is a top view illustrating a part of the cam clutch unit configuration shown in FIG. 2.
FIG. 8 is a front view illustrating a configuration example of a roller.

Each of the plurality of rollers 130 is formed larger than the cams 120 in the axial direction as shown in FIG. 7, and has a groove 135 at the center in the axial direction for the spring 140 to sit on or fit in.

The spring 140 is a garter spring, for example. The spring is fitted in the grooves 121 and 135 of the cams 120 and the rollers 130 to prevent the cams 120 and the rollers 130 from moving towards the outer race.

The rollers 130 in the above-described cam clutch unit 110 are dumbbell-shaped as shown in FIG. 8, and include an axially extending shaft portion 131 and a pair of large-diameter portions 132, each of which is continuous with either end of the shaft portion 131. The groove 135 is formed by the space between the pair of large-diameter portions 132 so that the shaft portion 131 in contact with the spring 140 receives a biasing force from the spring 140.

The rollers 130 are formed by a rolling process. The grooves 135 are a rolled groove formed such that the fiber flow of the material forming the rollers 130 extends continuously from the groove over to the large-diameter portions 132.

By using the rolled groove formed during the rolling process as the groove 135, the rollers 130 can have high strength, because the fiber flow of the material forming the rollers 130 is not cut, and also because of the increased density by compression. Rolling process does not produce chips as in a cutting process, and allows processing in a short time with relatively low power, which can help to achieve high productivity and to reduce production costs.

Figure 9:
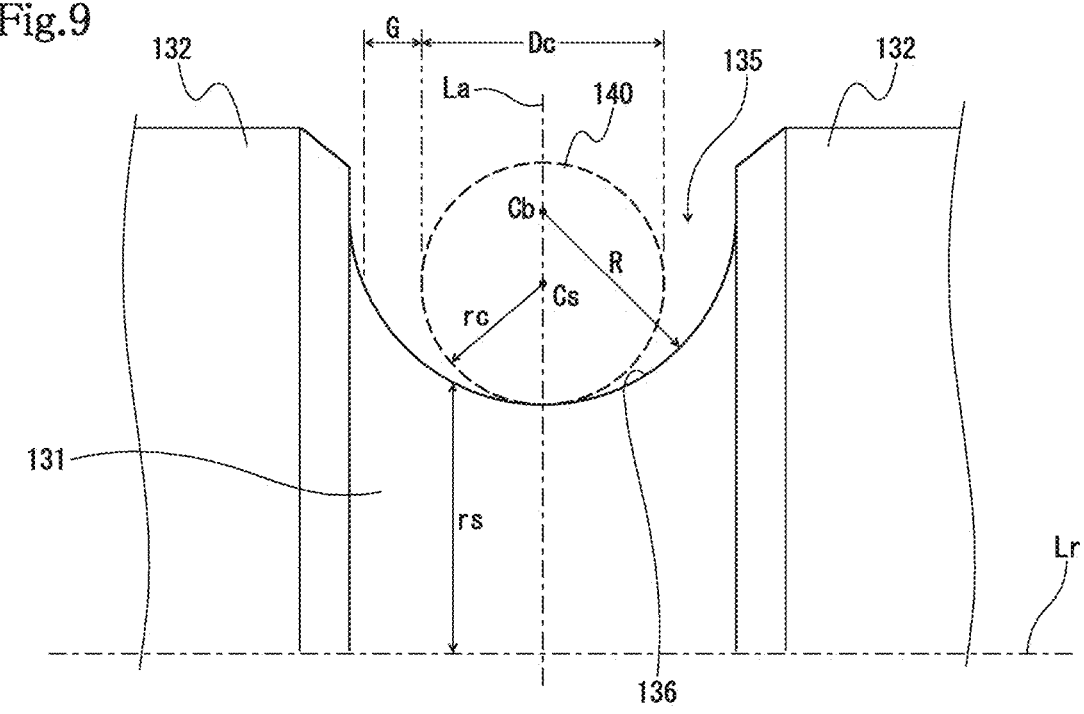
FIG. 9 is an enlarged view illustrating a part of the roller shown in FIG. 8.

The bottom surface 136 of the groove 135, or the outer circumferential surface of the shaft portion 131, is mirror symmetric about a center line La at the center in the axial direction as shown in FIG. 9, the radius rs of the shaft portion 131 monotonically increasing from the center line La towards the large-diameter portions in the axial direction.

In this embodiment, the bottom surface 136 of the groove 135 has a single arc cross-section with both ends smoothly joining to the end faces of the large-diameter portions 132. The radius of curvature R of the bottom surface 136 is greater than the wire radius rc of the spring 140 (=Dc/2, where Dc is the wire diameter of the spring 140). In FIG. 9, Lr denotes the rotation axis of the roller 130, Cs denotes the wire center of the spring 140, and Cb denotes the center of the radius of curvature of the bottom surface 136.

As shown in FIG. 7, the radius of curvature R of the bottom surface 136 of the groove 135 is set such that an axial length Sd between one end face of the cam 120 and one end face of the roller 130 when the cam 120 and the roller 130 are positioned with matched axial centers is greater than a clearance G between the spring 140 and the groove 135, with the wire center Cs of the spring 140 located at a radial position where the spring 140 is in contact with the bottom surface 136 of the groove 135 at the central position in the axial direction.

This configuration allows the grooves 135 of the rollers 130 and the grooves 121 of the cams 120 to more easily match each other in their axial positions, which improves the engagement performance of the cams, and reduces variations in axial dimensions.

As described above, in the cam clutch unit 110 described above, the bottom surface 136 of the groove 135 on the roller 130 has a single arc cross-section, so that the bottom surface 136 of the groove 135 guides the spring 140 towards the center line in the axial direction of the groove 135, which corrects the orientation of the rollers 130. This allows the rollers 130 to smoothly roll on the respective rolling surfaces of the inner race 101 and outer race 105. The rollers 130 are thus prevented from tilting about a radially extending axis, or from moving in the axial direction. This can reduce friction loss and jamming risk during freewheeling.

The grooves 135 of the rollers 130 and the grooves 121 of the cams 120 can be kept in axial positions that match each other, so that the spring 140 can be prevented from becoming zigzagged or changing shape. As a result, the cams 120 can be biased with a correct amount of force, which improves the engagement performance of the cams.

In addition, the rollers 130 themselves are dimensionally interchangeable with conventional rollers. This makes the rollers 130 highly versatile, as the rollers can be used also in conventional cam clutch units.

Figure 10:
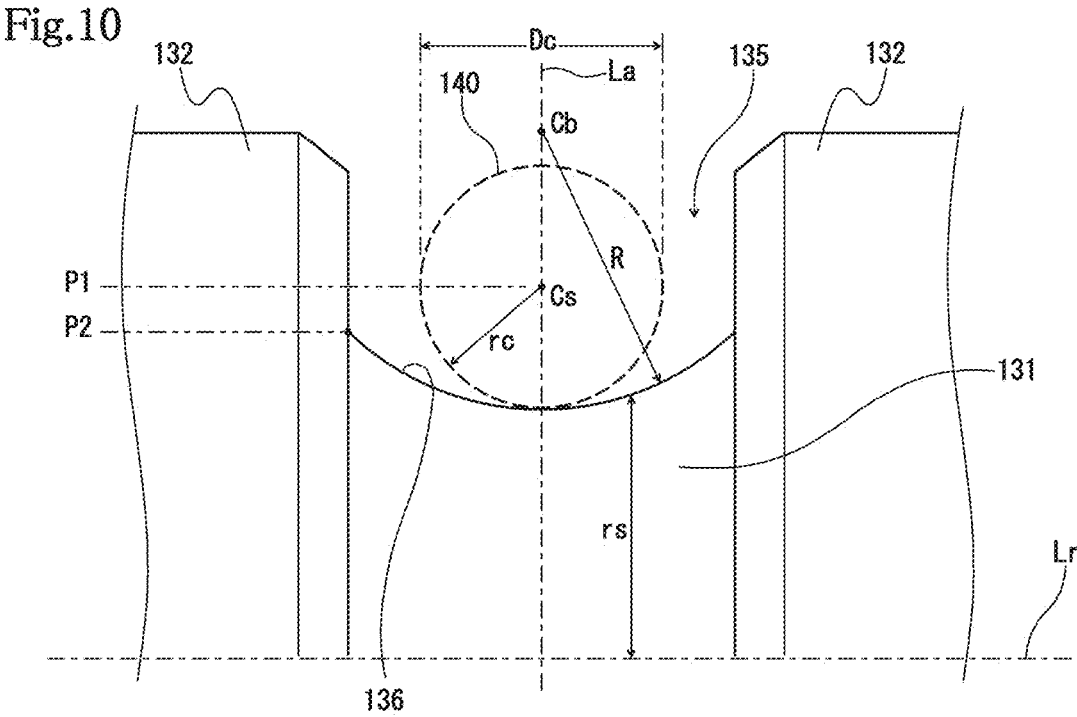
FIG. 10 is an enlarged view illustrating a part of another configuration example of the roller.

In the configuration example described above, the bottom surface 136 of the groove 135 on the roller 130 has a single arc cross-section that smoothly connects to the end faces of the large-diameter portions 132. Instead, as shown in FIG. 10, the bottom surface 136 of the groove 135 on the roller

130 can have a single arc cross-section with the center of the radius of curvature Cb located radially more outwardly than the peripheral edges of the end faces of the large-diameter portions 132. The radius of curvature R of the bottom surface 136 of the groove 135 in this configuration is set such that the radial position P2 of an intersection between the bottom surface 136 and the end face of the large-diameter portion 132 is positioned radially more inwardly than the radial position P1 of the wire center Cs of the spring 140, with the spring 140 being in contact with the bottom surface 136 of the groove 135 at the central position in the axial direction.

The cross-sectional shape of the bottom surface 136 of the groove 135 on the roller 130 is not limited to a single arc. The cross-section may have any of a compound curve, quadratic curve, involute curve, and freeform curve that includes a curve having a radius of curvature that is equal to or greater than the wire radius rc of the spring 140.

Figure 11:
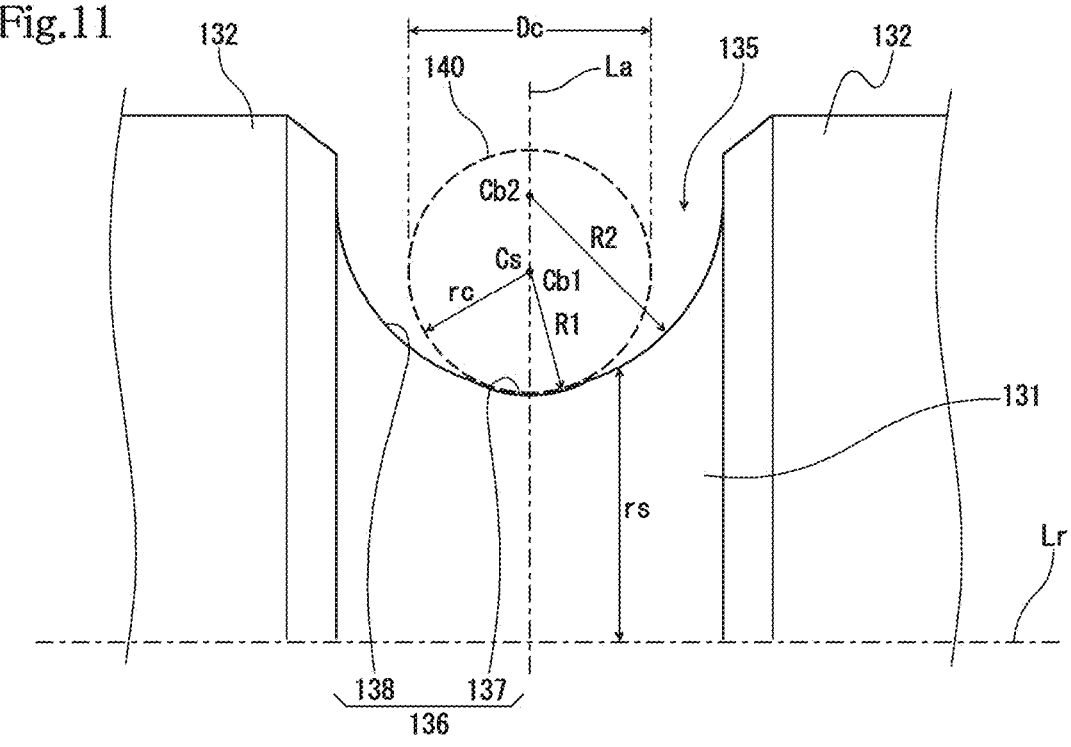
FIG. 11 is an enlarged view illustrating a part of yet another configuration example of the roller.

For example, the roller 130 shown in FIG. 11 has a groove 135 with a bottom surface 136 that has a compound curve cross-section, including a first arc 137 at the central position in the axial direction, and second arcs 138 continuous with either end of the first arc 137 and having a different radius of curvature from that of the first arc 137. The radius of curvature R1 of the first arc 137 is set equal to or greater than the wire radius rc of the spring 140, while the radius of curvature R2 of the second arc 138 is set greater than the radius of curvature R1 of the first arc 137. In this example, the radius of curvature R1 of the first arc 137 is set the same as the wire radius rc of the spring 140. Cb1 denotes the center of the radius of curvature of the first arc 137, and Cb2 denotes the center of the radius of curvature of the second arc 138.

Figure 12:
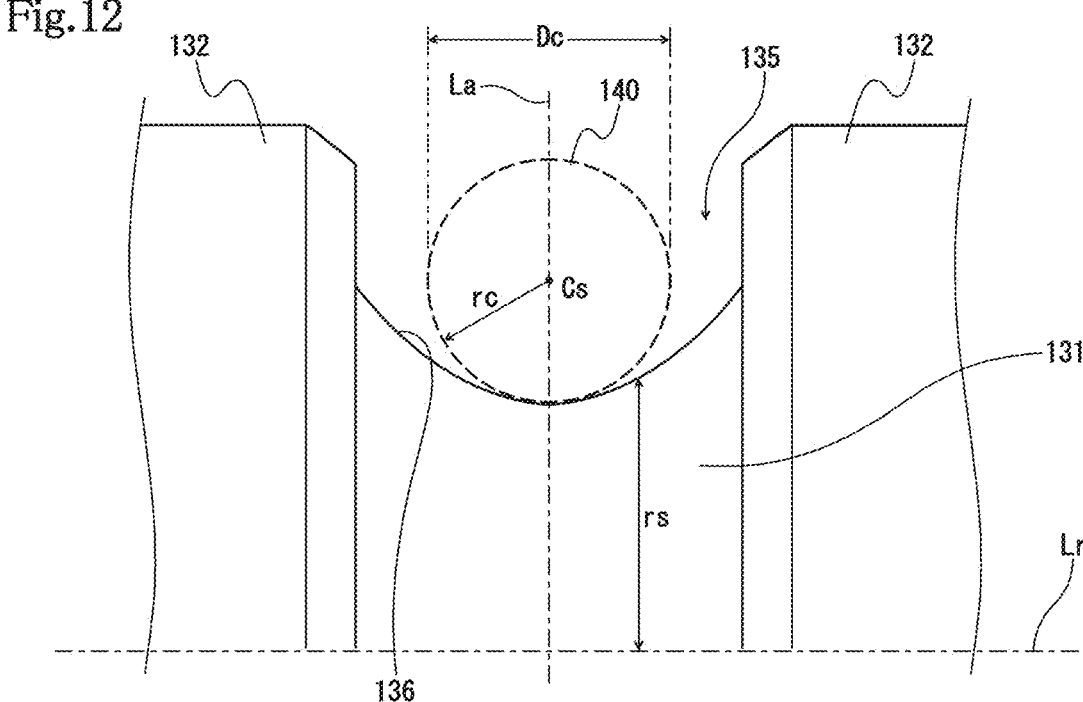
FIG. 12 is an enlarged view illustrating a part of a further configuration example of the roller.

The roller 130 shown in FIG. 12 has a groove 135 with a bottom surface 136 that has a quadratic curve cross-section, in which the radius of curvature is smallest on the center line La in the axial direction of the roller 130, and increases towards the large-diameter portions along the axial direction.

While the cam clutch unit 110 according to the embodiment described above is provided with the cage ring 111, the cam clutch unit can be configured without a cage ring.

Figure 13:
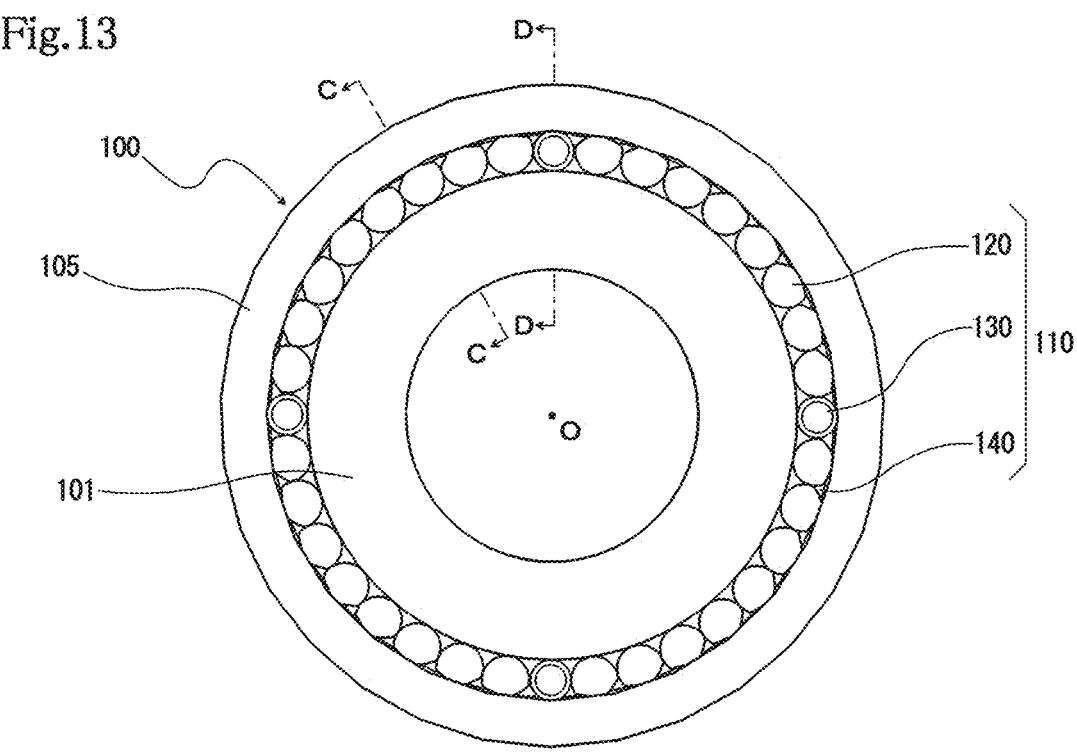
FIG. 13 is a side view illustrating a configuration example of a cam clutch including the cam clutch unit according to another embodiment of the present invention as seen from an axial direction.
Figure 14:
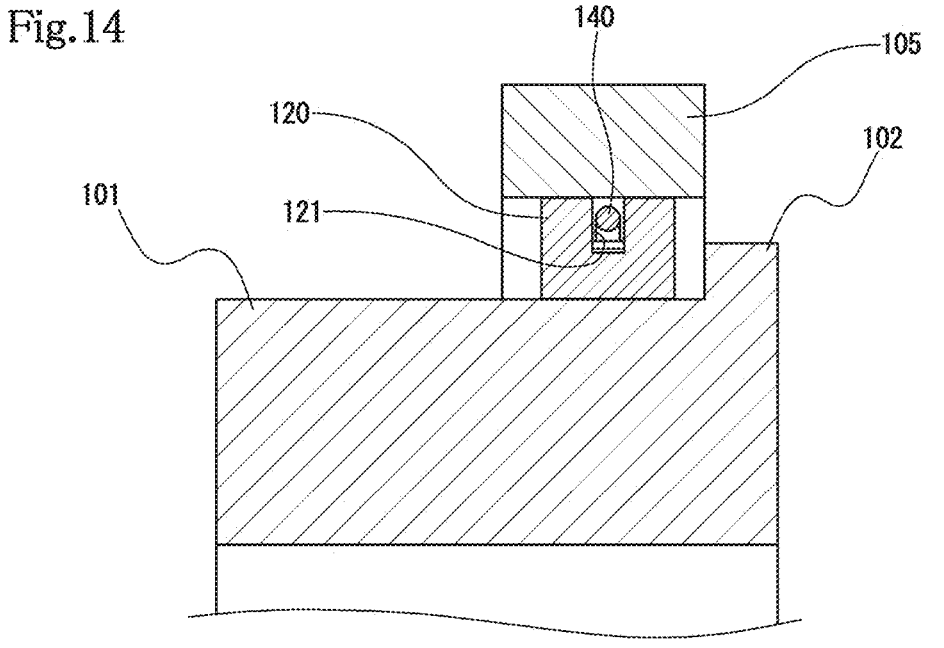
FIG. 14 is a cross-sectional view along the line C-C in FIG. 13.
Figure 15:
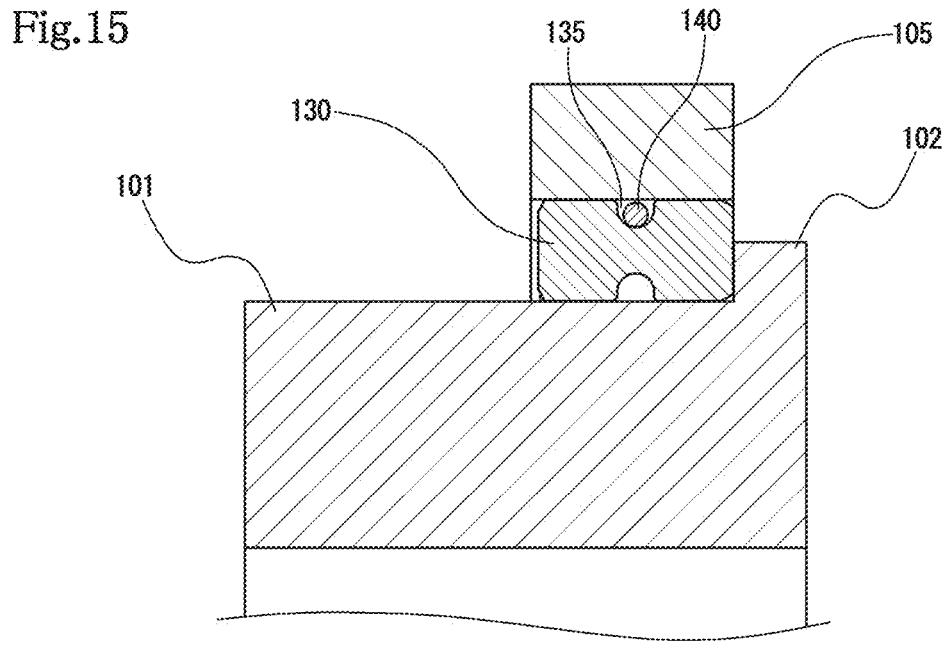
FIG. 15 is a cross-sectional view along the line D-D in FIG. 13.
Figure 16:
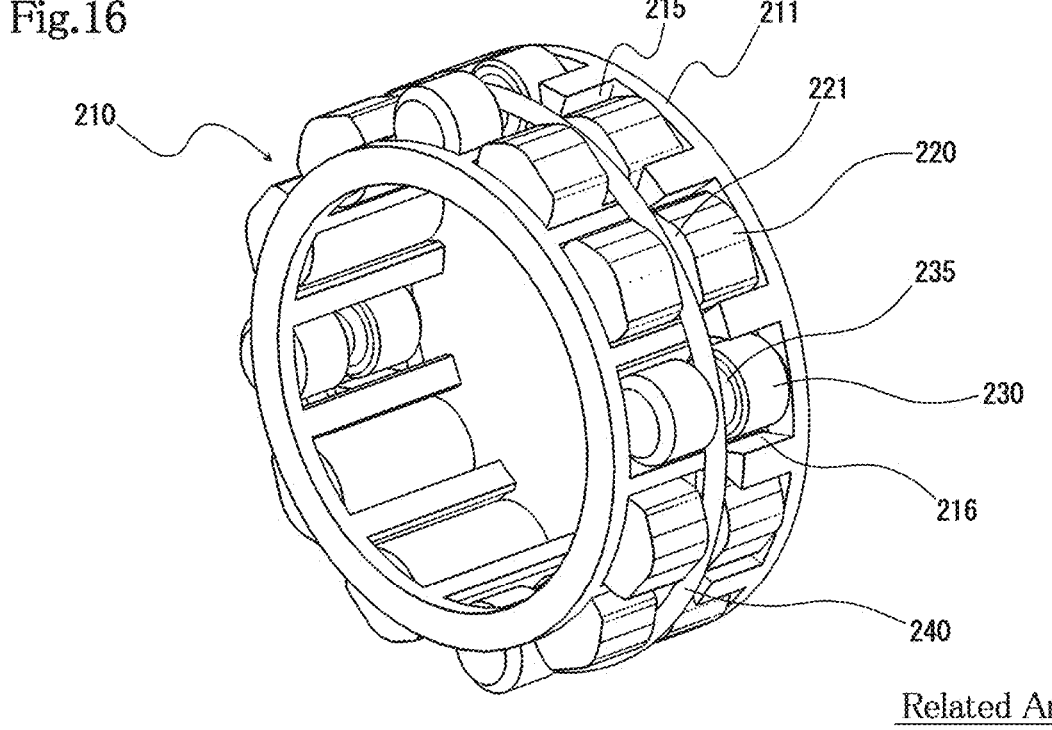
FIG. 16 is a perspective view illustrating a configuration example of a conventional cam clutch unit.
Figure 17:
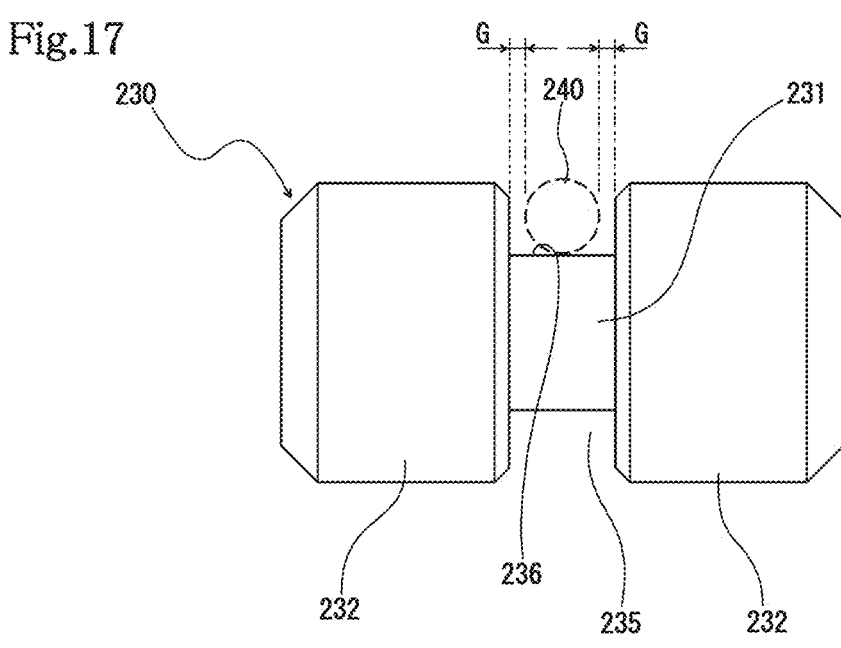
FIG. 17 is a front view illustrating a configuration example of a roller.
Figure 18:
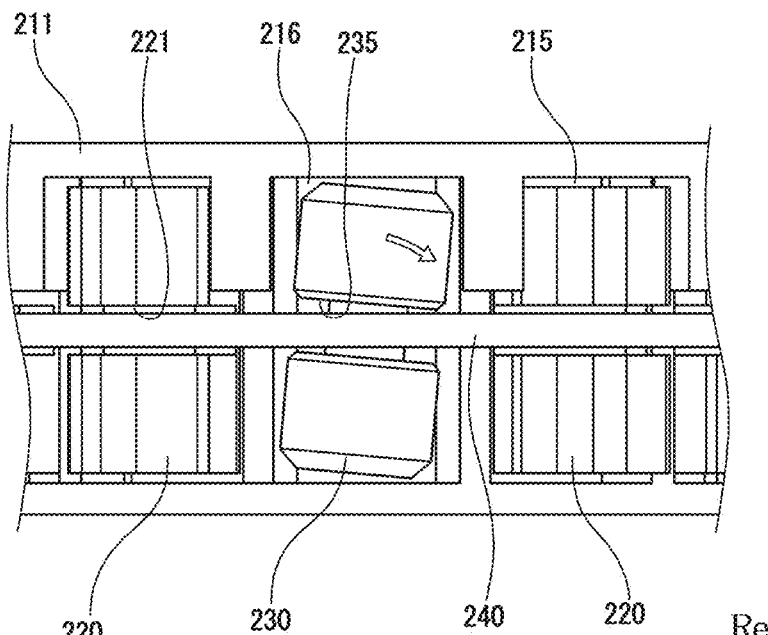
FIG. 18 is a schematic diagram illustrating a roller tilted about a radially extending axis in the cam clutch unit shown in FIG. 16.
Figure 19:
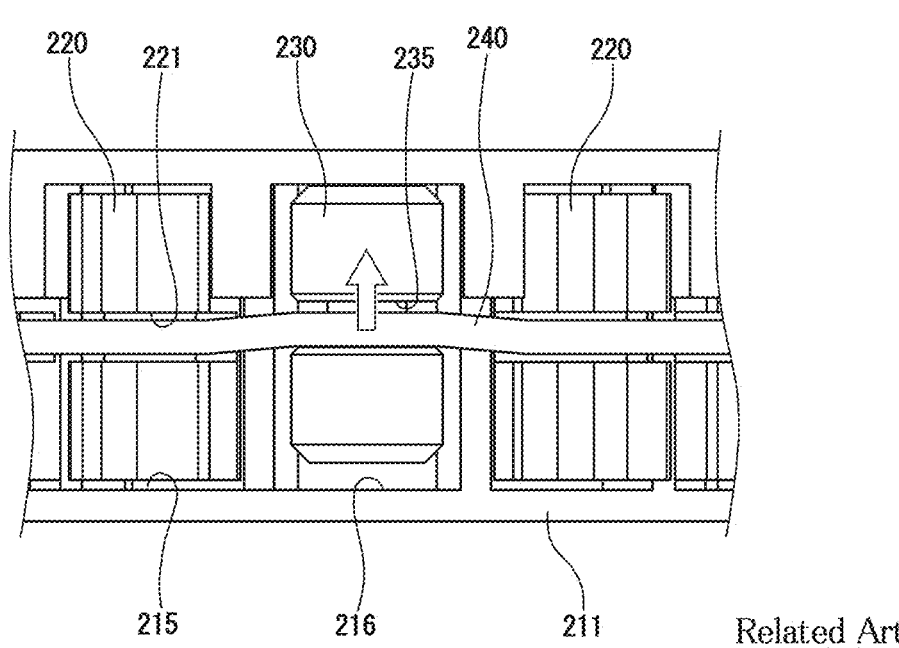
FIG. 19 is a schematic diagram illustrating an axially shifted roller in the cam clutch unit shown in FIG. 16.

As shown in FIG. 13 to FIG. 15, the cam clutch unit 110 according to another embodiment of the present invention does not include a cage ring, and is otherwise configured similarly to the cam clutch unit 110 according to the embodiment described in the foregoing. More specifically, the cam clutch unit 110 includes: a plurality of cams 120 and a plurality of rollers 130 arranged between an inner race 101 and an outer race 105 that are coaxial and rotatable relative to each other; and an annular spring 140 fitted in respective grooves 121 and 135 of the cams 120 and rollers 130 and biasing the cams 120 to make contact with the inner race 101 and outer race 105.

The inner race 101 in this cam clutch 100 is formed with a flange 102 at one axial end such as to radially protrude outwardly all around. A gear (not shown) is provided at the other axial end, to restrict the axial movement of the rollers 130.

As mentioned before, the bottom surface 136 of the groove 135, or the outer circumferential surface of the shaft portion 131, of the roller 130 is curved such that the outer diameter monotonically increases from the center in the axial direction towards the large-diameter portions. The bottom surface 136 of the groove 135 thus guides the spring 140 towards the center line in the axial direction of the groove 135, correcting the orientation of the rollers 130.

Therefore, the grooves 135 of the rollers 130 and the grooves 121 of the cams 120 are kept in axial positions that match each other, so that the spring 140 can be prevented from becoming zigzagged or changing shape, i.e., variations in the axial dimensions can be reduced.

Accordingly, the effects of reducing friction loss and roller jamming risk during freewheeling, as well as improving the engagement performance of the cams 120, can also be achieved in the cageless configuration.

While embodiments of the present invention have been described above in detail, the present invention is not limited to the embodiments described above. Various design changes may be made without departing from the scope of the present invention set forth in the claims.

What is claimed is:

1. A cam clutch unit comprising:
a plurality of cams and a plurality of rollers arranged between an inner race and an outer race that are coaxial and rotatable relative to each other; and
an annular spring fitted in a groove formed in each of the cams and the rollers, and biasing the cams to make contact with the inner race and the outer race,
the rollers each including an axially extending shaft portion and a pair of large-diameter portions respectively continuous with both ends of the shaft portion, the groove being formed by a space between the pair of large-diameter portions, and the shaft portion being configured to contact the annular spring to receive a biasing force from the annular spring,
the annular groove is formed such that a clearance allowing axial displacement of the annular spring is provided between the annular spring and the large-diameter portions,
the shaft portion forming a bottom surface of the groove has an outer circumferential surface that allows the annular spring to contact the groove at a central position in an axial direction of the groove, the outer circumferential surface being a curved surface so that the shaft portion increases in outside diameter monotonically from the central position in the axial direction of the groove towards the large-diameter portions.

2. The cam clutch unit according to claim 1, wherein the groove of the roller is a rolled groove formed such that a fiber flow of a material forming the roller extends continuously from the groove to the large-diameter portions.

3. The cam clutch unit according to claim 1, wherein
the rollers are formed larger in size than the cams in an axial direction, and
an axial length between one end face of the cam and one end face of the roller, when the cams and the rollers are positioned with matched centers in the axial direction, is greater than a clearance between the spring and the groove in a case where the spring has a wire center located at a radial position when the spring is in contact with the bottom surface of the groove at the central position in the axial direction.

4. The cam clutch unit according to claim 1, wherein
the groove of the roller has a bottom surface with a cross-sectional shape that is selected from any of a single arc, a compound curve, a quadratic curve, an involute curve, and a freeform curve, and
the bottom surface of the groove includes a curve with a radius of curvature that is equal to or greater than a wire radius of the spring.

5. The cam clutch unit according to claim 4, wherein
the groove of the roller has a bottom surface with a single arc cross-section, and
the bottom surface has a greater radius of curvature than the wire radius of the spring.

6. The cam clutch unit according to claim 5, wherein the radius of curvature of the bottom surface is set such that, when the spring is in contact with the bottom surface of the groove at the central position in the axial direction, an intersection between the bottom surface and an end face of the large-diameter portion is radially positioned more inwardly than a wire center of the spring.

7. The cam clutch unit according to claim 4, wherein
the groove of the roller has a bottom surface with a compound curve cross-section,
including a first arc at the central position in the axial direction, and second arcs continuous with either end of the first arc and having a different radius of curvature from that of the first arc, and
the first arc has a radius of curvature that is equal to or greater than the wire radius of the spring, and the second arcs has a greater radius of curvature than that of the first arc.

* * * * *